United States Patent [19]

Bielecki et al.

[11] Patent Number: 5,023,059
[45] Date of Patent: Jun. 11, 1991

[54] RECOVERY OF METAL VALUES AND HYDROFLUORIC ACID FROM TANTALUM AND COLUMBIUM WASTE SLUDGE

[76] Inventors: Edwin J. Bielecki, 310 E. Sixth St., Boyertown, Pa. 19512; Karl A. Romberger, 100 Martin Ave., Gilbertsville, Pa. 19512; Bart F. Bakke, 126 Russell Ave., Douglassville, Pa. 19518; Martin A. Hobin, 3821 High Point Dr., Allentown, Pa. 18103; Charles R. Clark, 339 S. Hanover St., Pottstown, Pa. 19464

[21] Appl. No.: 266,394

[22] Filed: Nov. 2, 1988

[51] Int. Cl.$^5$ ............................................. B01D 11/00
[52] U.S. Cl. ........................................ 423/9; 423/18; 423/20; 423/63; 423/68; 423/DIG. 14; 75/374; 75/39 P; 75/622; 210/688
[58] Field of Search ............... 423/63, 68, 9, 18, 20, 423/D 14; 75/101 R, 101 BE, 121, 622, 394, 723, 398; 210/688

[56] References Cited

U.S. PATENT DOCUMENTS

| | | | |
|---|---|---|---|
| 4,309,389 | 1/1982 | Meyer | 423/63 |
| 4,446,116 | 5/1984 | Krismer et al. | 423/63 |
| 4,451,438 | 5/1984 | Flocter et al. | 423/20 |
| 4,619,744 | 10/1986 | Horton | 204/105 R |

Primary Examiner—Brooks H. Hunt
Assistant Examiner—Ngollan Mai
Attorney, Agent, or Firm—David J. Koris

[57] ABSTRACT

A metallurgical processing system for economically recovering metal values, such as columbium, tantalum, thorium, and uranium from dilute source solids, such as digestion sludges, by a series of steps including:

1) slurrying the source solids with dilute hydrofluoric acid to produce a solid phase and a liquid phase containing dissolved tantalum and columbium, then extracting tantalum and/or columbium from the liquid phase by means of a liquid ion-exchange process and then, additionally;
2) roasting the solid phase with sulfuric acid to recover and recycle hydrofluoric acid, leaching the roasted solids with dilute sulfuric acid to produce a disposable solid phase and a liquid phase containing thorium and uranium, and extracting thorium and uranium from the liquid phase by means of a liquid-liquid amine extraction process.

44 Claims, 8 Drawing Sheets

RECOVERY OF METAL VALUES AND HYDROFLUORIC ACID FROM TANTALUM AND COLUMBIUM WASTE SLUDGE

FIELD OF THE INVENTION

The present invention relates generally to the recovery of metal values and hydrofluoric acid from dilute source solids and particularly to the recovery of tantalum, columbium, uranium, and thorium from the sludge remaining after the conventional processing of ores, concentrates, or regular grade tin slags.

BACKGROUND OF THE INVENTION

There are numerous proposed schemes by which various natural ores, concentrates and slags may be processed for the recovery of metal values. One commercial scheme for the extraction and separation of tantalum and columbium (also known as niobium) values from beneficiated ores or from the widely available tin slags, is described in detail in U.S. Pat. Nos. 2,767,047; 2,953,453; 2,962,372; 3,117,833; 3,300,297; 3,658,511; 3,712,939 and 4,164,417. In this process, feed solids are digested with hot, concentrated hydrofluoric acid to solubilize most of the tantalum and columbium values as fluorides. A liquor containing the dissolved metal values is separated from a waste sludge and treated in a multistage liquid-liquid extraction cascade wherein the metal values are extracted with methylisobutyl ketone (MIBK). The waste sludge from this process still contains insolubles such as uranium and thorium and also contains within the entrained insolubles significant amounts of dissolved tantalum and columbium (about 1–5% by weight of each). Disposal of uranium and thorium is regulated by the Nuclear Regulatory Commission (NRC). Presently, the bulk of this waste sludge is being stockpiled at the ore processing facilities because of the difficulty in recovering the small amounts of remaining metal values, resulting in an ever growing disposal problem as well as lost revenues from the unrecovered metal values.

A general discussion of other ore process schemes is found in *Extractive Metallurgy of Niobium, Tantalum and Vanadium*, INTERNATIONAL METALS REVIEW, 1984, Vol. 29, No. 26, BB 405–444, published by The Metals Society (London).

OBJECTS AND SUMMARY OF THE INVENTION

It is an object of this invention to provide an efficient process for the recovery of metal values from dilute source solids, such as sludge residues from the dissolution of ores and concentrates. It is another object of this invention to provide an ion-exchange process for the improved extraction of metal values from dilute aqueous process streams.

It is a further object of this invention to recover and to recycle hydrofluoric acid used in metal value recovery processes.

It is still another object of the present invention to provide a dilute source solids metal values recovery process which provides solid and liquid waste products which are safe for conventional disposal.

The present invention provides an efficient process for the recovery of metal values, particularly tantalum, columbium, uranium and thorium, from dilute source solids, such as sludge residues resulting from the processing of ores and concentrates. In the first step of the process, dilute hydrofluoric acid is thoroughly mixed with a sludge residue to form a slurry. The resulting slurry comprises a dilute aqueous acid phase containing among others, dissolved tantalum and columbium values, and an undissolved solids phase. As a result of forming the slurry, the concentration of metal values in the residue is decreased. However, to ensure that as much of the metals as possible is recovered, it is necessary to dilute the liquor remaining with the solids as much as possible. This is done preferably by counter-current washing, although it is also possible to utilize multiple settling and decanting washing operations. An aqueous acid phase is then separated from the undissolved solids phase and the resulting aqueous acid phase is then clarified, preferably by means of a polishing filter, to remove any residual solids. Thereafter, the tantalum and columbium values are extracted from the aqueous acid phase by means of a liquid ion-exchange agent. The tantalum and columbium values are stripped from the ion-exchange agent by means of any suitable stripping agent, preferably aqueous ammonium bifluoride. The tantalum and columbium are recovered as solids by precipitation with a base, preferably ammonia or ammonium hydroxide. The precipitated tantalum and columbium hydroxides are separated from the liquor by filtration. The tantalum and columbium hydroxides are recycled to the ore digestion operation and the liquors are sent to waste.

The undissolved solids phase which was separated from the aqueous acid phase containing the tantalum and columbium metals is processed as follows: first, the solids phase is roasted with sulfuric acid to convert the water insoluble fluorides to water soluble sulfated solids and gaseous hydrofluoric acid; second, the gaseous hydrofluoric acid is condensed and the condensate is recycled; third, the sulfated solids are leached with dilute sulfuric acid to solubilize uranium and thorium; fourth, the uranium and thorium are concentrated by liquid ion-exchange techniques and recovered as hydroxides following a stripping operation with a base; and fifth, the remaining sulfated solids are suitable for disposal in accordance with the regulations of the Nuclear Regulatory Commission.

DETAILED DESCRIPTION OF THE INVENTION

The present invention is directed to a process for economically recovering metal values such as tantalum, columbium, uranium and thorium, from dilute source solids, such as sludge residues resulting from processing of ores. The present invention is also directed to a process for the recovery of metal values from sludge residues while eliminating toxic liquid and solid wastes. The present invention is also directed to an ion-exchange process for extracting tantalum and columbium metal values from dilute aqueous process streams. Moreover, the present invention is directed to a process for recovering and recycling hydrofluoric acid used in metal value recovery processes.

Figure 1:
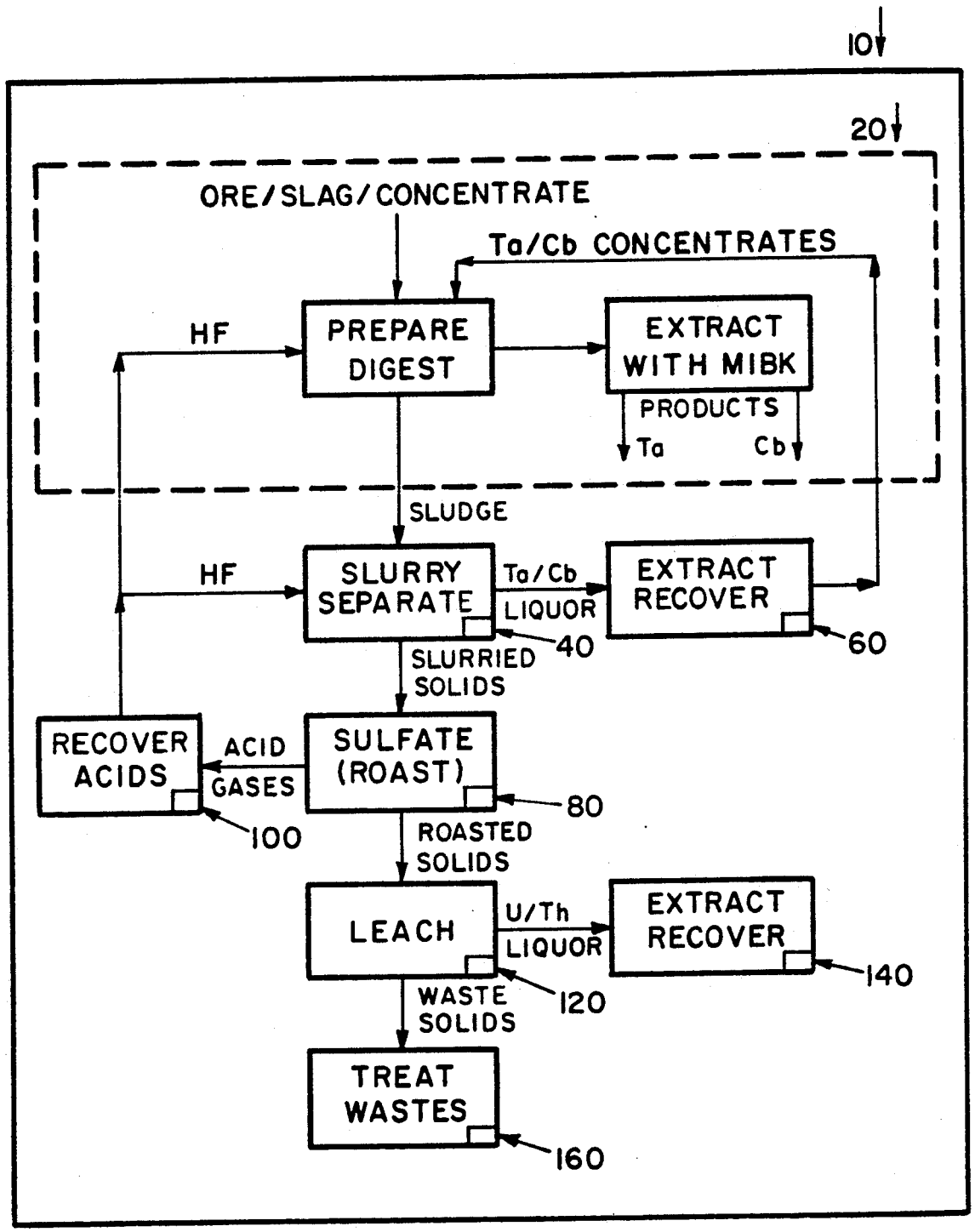
FIG. 1 is a schematic block diagram showing an integrated system for recovering metal values from ores, concentrates or slags according to conventional practice in combination with the process of the present invention.

As best seen in FIG. 1, the process of the present invention can be performed in an integrated metal values recovery system 10, which includes a conventional metal values processing section 20, a sludge slurrying and separations section 40, a tantalum and columbium extraction and recovery section 60, a sludge sulfation/roasting section 80, a sludge leaching section 120 and a thorium and uranium extraction and recovery section 140. In addition, an acids recovery section 100 may be included for recovering and recycling acids. An aqueous waste streams treatment section 160 is included in the overall metal values recovery system 10 for preparing the residual streams for safe disposal.

Individual process sections from the integrated process of FIG. 1 are illustrated in detail in FIGS. 2 through 8.

CONVENTIONAL METAL VALUE RECOVERY

Figure 2:
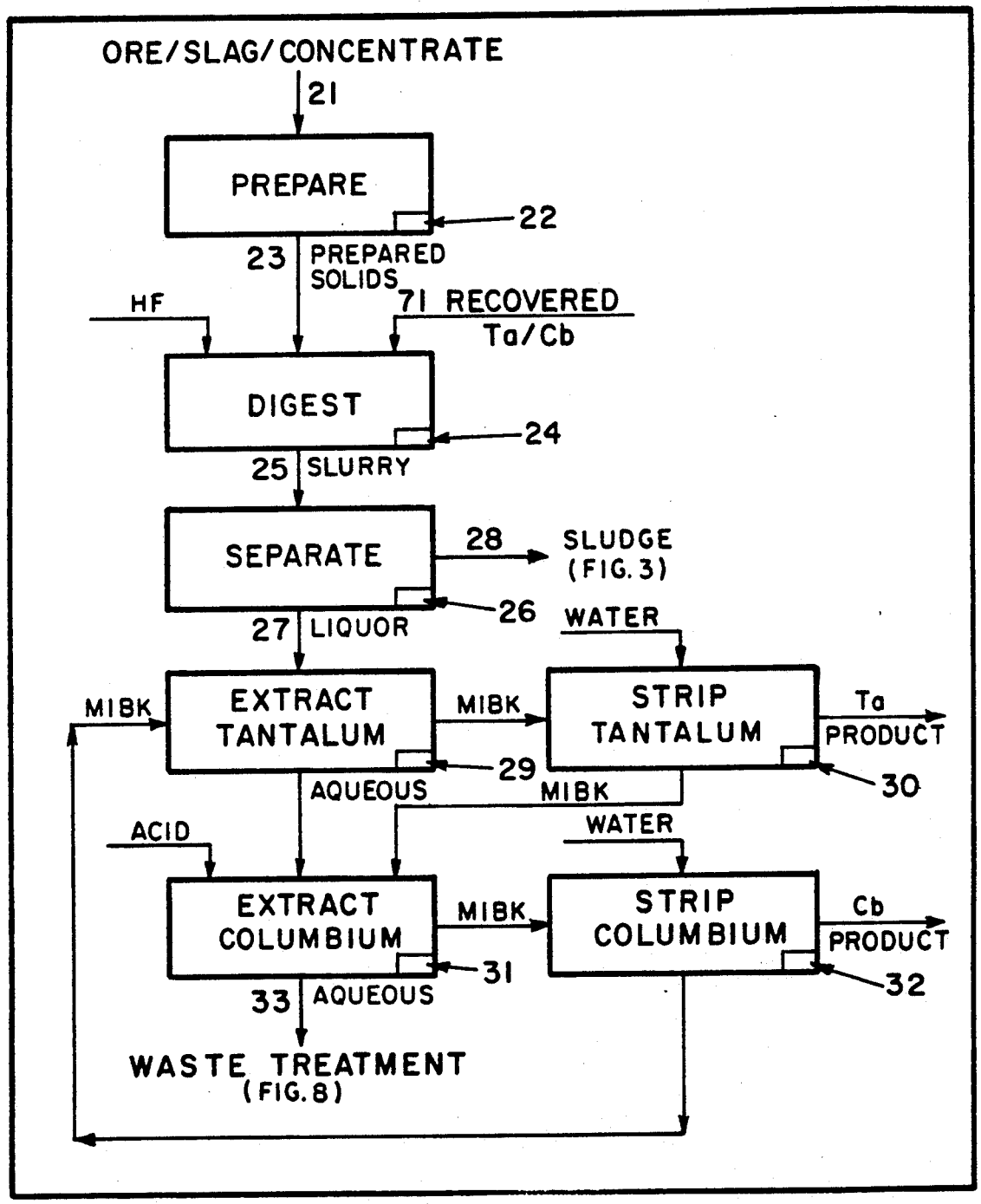
FIG. 2 is a schematic block diagram showing the conventional process for treating ores, concentrates or slags shown as block 20 in FIG. 1.

FIG. 2 illustrates a conventional process scheme for the recovery of tantalum and columbium values from natural ores, slags or concentrates.

As shown in FIG. 2, a solids feedstream 21 of ore, slag, or concentrate is prepared 22 for acid dissolution, by which is meant reducing the particle size, to facilitate the separation of the metal values from the impurities. Often, simple grinding or crushing will be sufficient to prepare the feed materials.

A feedstream 23 of the prepared solids is then introduced to a digester 24 containing hot concentrated hydrofluoric acid to cause dissolution of the tantalum and columbium components. Tantalum and columbium concentrates 71 recovered in the process of the invention could be recycled to digester 24. Ordinary 70% by weight concentrated hydrofluoric acid diluted to about 40 to 50% by weight is the preferred starting material, although weaker and stronger grades of acid may be used, including recycled hydrofluoric acid 110 recovered as part of the invention. The hydrofluoric acid used to dissolve the feed materials may be supplemented with other acids, such as sulfuric, oxalic or hydrochloric.

In practice, the hydrofluoric acid is heated to at least 70° C. to 75° C. in the digester and the prepared feedstream 23 is then added to the digester 24, preferably in controlled amounts so as to maintain a near constant temperature in the digester. Additional heat is supplied when necessary to maintain the elevated temperature. Acid dissolution of the solids is continued under these conditions until 95 to 99+% of the tantalum and columbium values are dissolved in the hydrofluoric acid.

A slurry stream 25 from the digester 24 is then fed to a separator 26, e.g. a pressure filter, to produce a liquor stream 27 and a sludge stream 28. Separation of liquor stream 27 from sludge stream 28 is preferably achieved with minimal water washing so as to maintain high concentrations of tantalum, columbium and free acid in the liquor stream 27. The liquor stream 27 is fed to a conventional multi-stage liquid-liquid extraction cascade 29, 30, 31 and 32 wherein the dissolved tantalum and columbium values are selectively extracted from the aqueous hydrofluoric acid solution using an immiscible organic solvent as the extractant, preferably MIBK, while the depleted aqueous stream 33 goes to waste treatment. This extraction method has gained the most success in practice and is more thoroughly described in U.S. Pat. No. 3,712,939, which is incorporated herein by reference.

The compositions of the solids feedstream 21 and the resulting residual sludge 28 produced by this process vary considerably depending on the type and origin of the feed material. For example, a typical tantalite ore may contain from 20% to 50% tantalum and only about 1% to 10% columbium, whereas columbite ore may contain 3% to 20% tantalum and 10% to 30% columbium. Eastern (Malaysian) tin slags may contain 2% to 5% of each metal, while African tin slags may contain 5% to 15% each. Impurities in tin slags typically include CaO (5–20%), $SiO_2$ (10–40%), FeO (5–20%), $TiO_2$ (5–15%), $Al_2O_3$ (5–10%), $ZrO_2$ (1–5%), and various other minor elements and usually include some thorium and uranium.

The sludges remaining after digestion of the ores, slags or concentrates are primarily unreacted materials, insoluble fluoride salts, and hydrofluoric acid-containing digestion liquors. The sludge stream 28 remaining after digestion has been analyzed at various times and been found to contain about 30% to 60% moisture and on a dry weight basis up to about 3.6% tantalum, up to about 3.0% columbium, up to about 1% uranium, up to about 1% thorium, and up to about 40% fluorides. On a dry basis, the sludge weight is about 25% to 75% of the initial input solids weight depending on the origin (composition) of the feed materials.

SLURRYING OF RESIDUAL SLUDGE

Figure 3:
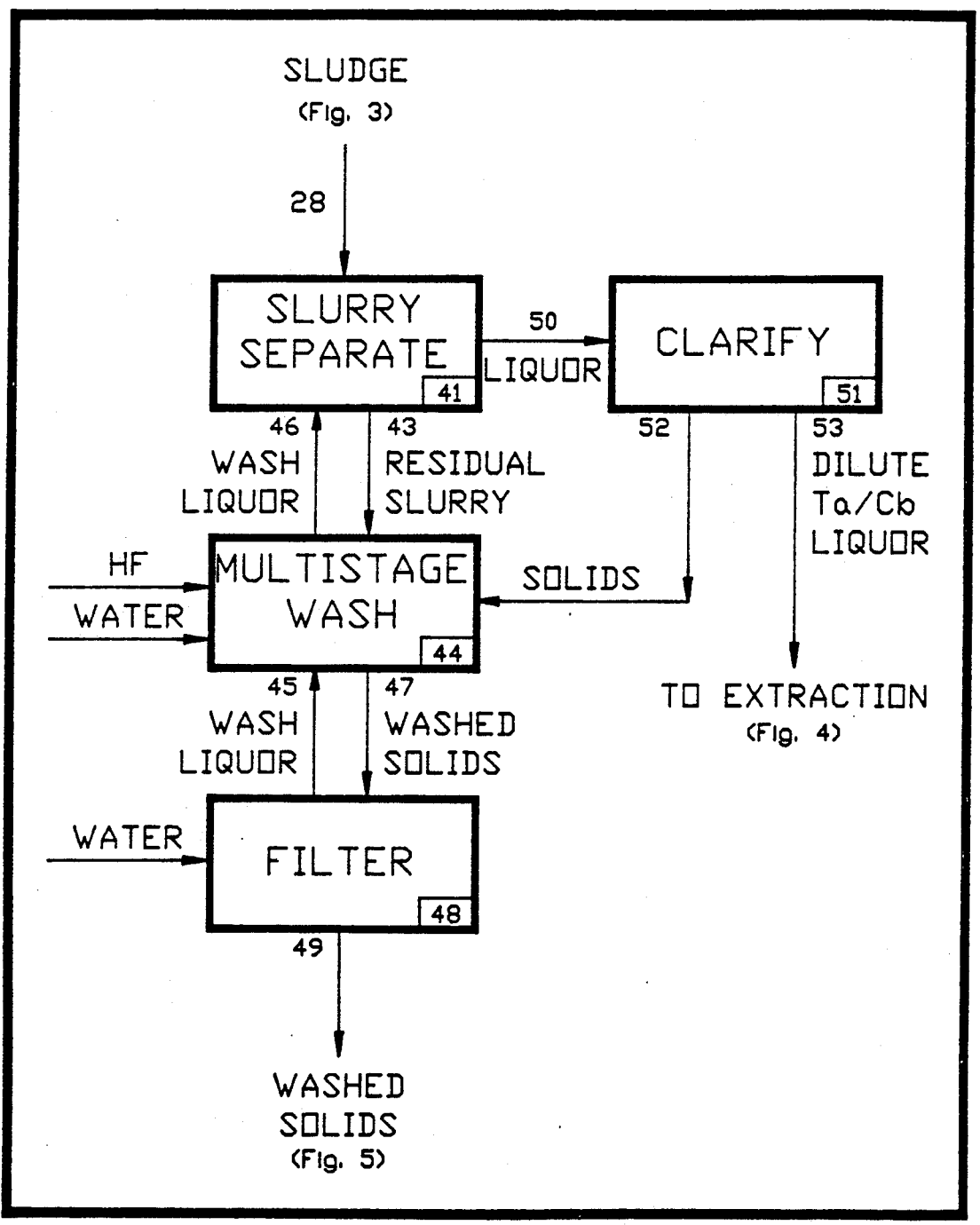
FIG. 3 is a schematic block diagram showing separation of tantalum and columbium from the undissolved solids phase of the sludge shown as block 40 of FIG. 1.

FIG. 3 illustrates the process section for the improved recovery of tantalum and columbium metal values from sludges according to the process of the invention.

According to the invention, the residual sludge stream 28 from the conventional ore processing section of FIG. 2, is thoroughly slurried in one or more slurrying vessels 41, preferably multi-stage, counter-current vessels, with aqueous hydrofluoric acid at a temperature of about 50° to 95° C. for about 15 to 30 minutes. The hydrofluoric acid concentration may vary greatly, with the preferred concentration being about 3%–5% for reasons of economy and ease of processing. Slurrying in the hydrofluoric acid frees most of the dissolved tantalum and columbium values contained in the sludge from the sludge solids. Also, during the slurrying some, but not all, of the remaining undissolved tantalum and columbium materials in the solids are solubilized.

The solid/liquid mixtures in slurrying vessels 41 are separated i.e., filtered or decanted, to produce a liquor stream 50 containing the additional tantalum and columbium values and a residual slurry 43 which contains among other things undissolved solid compounds and occluded digestion liquor bearing dissolved tantalum and columbium.

The residual slurry 43 is fed to a cascade of multistage countercurrent washing mixers 44 where it is thoroughly washed with fresh hydrofluoric acid and/or water to recover the tantalum and columbium containing digestion liquor. The washing process is preferably performed by multi-stage settling and decantation or multi-stage belt-filter washing. In order to minimize the amount of liquid formed in the slurrying process, an equilibrium system adds all the water and hydrofluoric acid solution 46 which enters the slurrying/separation operation 41 as wash water for the filtering operation 48 and the multistage washing mixers 44. This is contrary to the usual practice of limited or single stage washing of solids, in that the objective here was to minimize the liquor volume and thereby maintain a high concentration of metal values in the liquor stream for the later amine extraction processes as shown in FIG. 4.

The slurry 47 of washed solids is filtered 48 to yield washed slurried solids 49 and a very dilute filtrate 45 which is recycled to the washing mixers 44. Here the filtrate 45 is mixed with fresh dilute aqueous hydrofluoric acid and used in washing the solids in the incoming slurry 43. The solution is now returned as a more concentrated liquor 46 to the slurrying vessel 41 where its concentration is increased to its maximum value by mixing with fresh incoming sludge 28. The most concentrated filtrate is now removed as liquor stream 50 and conveyed preferably to a clarifier 51. Solids 52 from clarifier 51 are returned to the washing mixers 44. The clarified liquor stream 53 containing Ta and Cb is sent to extraction and recovery of the Ta and Cb as described in FIG. 4. The concentrations of tantalum and columbium values in the clarified liquor stream 53 vary widely depending upon the amounts of soluble tantalum and columbium in the sludge 28. Concentrations are nominally 2-6 g/L each in dissolved $Ta_2O_5$ and $Cb_2O_5$. The clarified liquor stream 53 also contains 3-5% hydrofluoric acid. The clarified liquor stream 53 is conveyed to a subsequent extraction section 60 of FIG. 1 for recovery of tantalum and columbium, as discussed hereinafter with respect to FIG. 4. Clarification is preferably done with a polishing filter.

Figure 4:
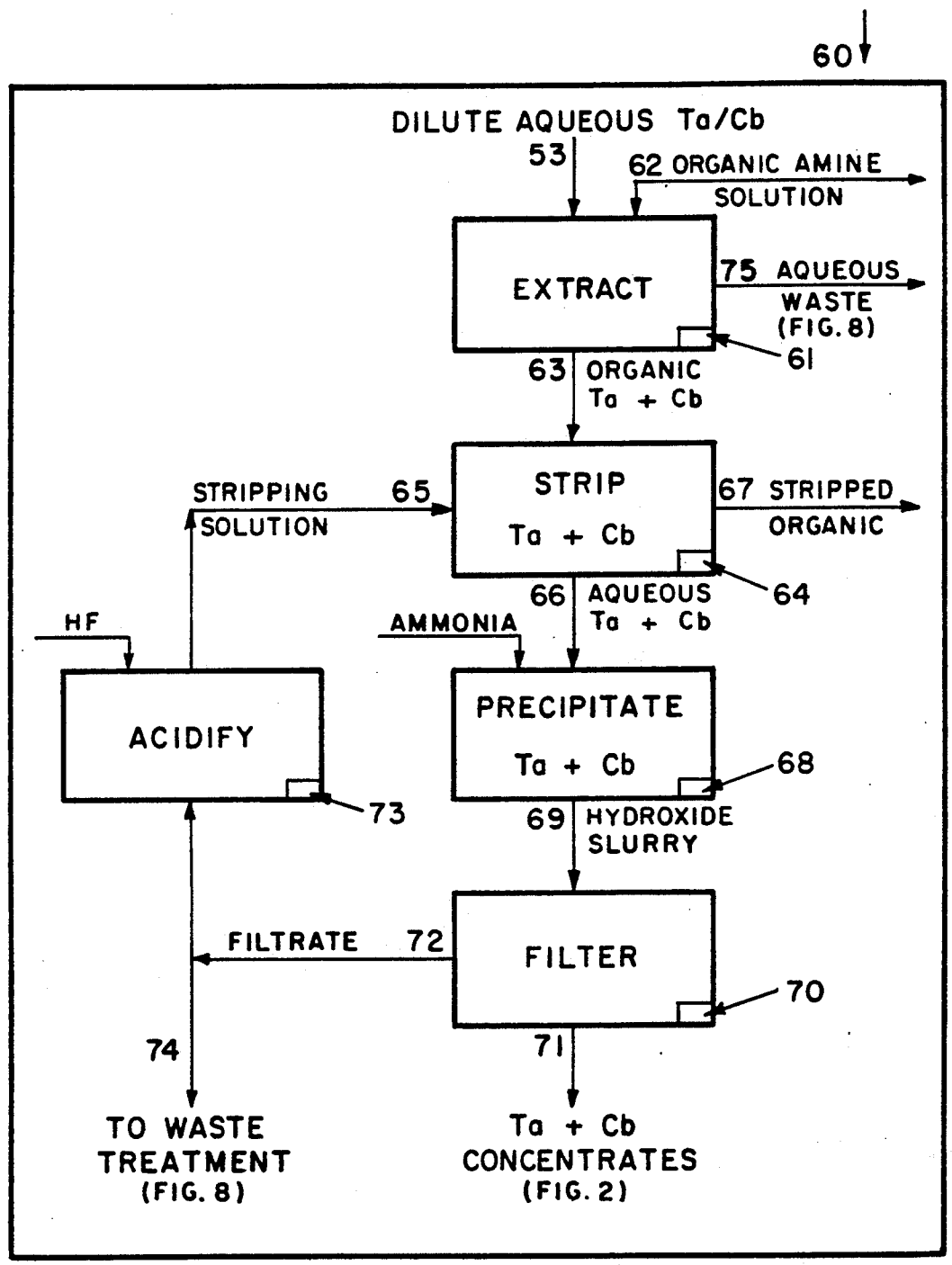
FIG. 4 is a schematic block diagram showing the extraction and recovery of the tantalum and columbium from the aqueous acid phase shown as block 60 of FIG. 1.

At this point in the process, normally about 80-95% of the tantalum and columbium values which were initially in the input sludge stream 28, are transferred to the clarified liquor stream 53, and are thereafter recovered in the extraction section of FIG. 4. The slurried solids stream 49 is sent to the sulfation process as described hereinafter with respect to FIG. 5.

Numerous tests were performed in the laboratory and in a pilot plant to determine the effects of many of the processing variables on the steps of the process. In the sludge slurrying process illustrated in FIG. 3, several observations were made. First, sludge contact time in slurrying tank 41 was found to yield a minimal increase in the tantalum and columbium values recovered beyond 15 minutes. Second, an increase in reaction temperature from about 50° C. to about 95° C. and/or an increase in the acid concentration from about 1% to about 5% by weight, showed a slight improvement in the dissolution of the metal values; and third, it was discovered that the liquid-to-solid ratio (liter/kg) during slurrying 41 had the most significant effect on recovery of metal values from the sludge. Within the preferred temperature range of about 70° C. to 75° C. and the preferred acid concentration range of 3% to 5% (by weight), it was found that the liquid-to-solid ratio should be greater than 1.5 and preferably from 3 to 5 (i.e., 3 to 5 liters hydrofluoric acid per kilogram of sludge) in order to most effectively free metal values from the sludge.

Tantalum and Columbium Separation From Dilute Aqueous Streams

FIG. 4 illustrates the basic steps involved in the tantalum and columbium separation process shown in box 60 of FIG. 1 of the present invention. The clarified liquor stream 53 from the sludge slurrying process of FIG. 3, containing columbium and tantalum values, is mixed at extraction unit 61 with an organic solvent 62 containing a suitable amine to extract the metal values. It has been discovered that secondary amines, such as a N-lauryltrialkylmethylamine, are particularly suited for recovery and concentration of metal values from dilute aqueous streams. In a preferred embodiment, the secondary amine is diluted to about 0.1 to 0.3 molar with a substantially water-insoluble organic solvent, such as kerosene cuts or mineral spirits, and modifiers, such as isodecanol, tridecanol, normal decanol, or other long chain alcohols, so as to enhance the separation of the organic and aqueous phases. It is also preferable that a series of extraction units 61, e.g. multistage, countercurrent, liquid-liquid extraction units be employed for improved metal value recovery.

Extraction using the preferred liquid amine ion-exchanger behaves similarly to extraction via a solid anion-exchange resin. The tantalum and columbium metal values are extracted from the clarified liquor stream 53 during contact with the amine-containing organic solvent 62 in the extraction unit 61 to produce a metal-loaded organic solvent stream 63. The metal-loaded organic solvent stream 63 is then sent through a series of stripping/regenerating units 64 wherein the stream is contacted with an aqueous stripping solution 65, which may be $NH_4FHF$ ($NH_4HF_2$), HF, $NH_4F$, $NH_4Cl$, $NH_4F/HCl$, HCl, $H_2SO_4$, $Na_2CO_3$, $(NH_4)_2CO_3$, NaOH, or other combinations, to produce either an aqueous acidic stream-containing dissolved tantalum and columbium values or a basic aqueous stream containing precipitated tantalum and columbium hydroxides.

The concentration of stripping solution 65 is not critical to the chemistry of the process. However, for improved economics, it is preferred that the solution be concentrated. Moreover, for economic reasons, the volume ratio of the organic phase to the stripping phase is as high as practical consistent with complete transfer of metals from the organic phase to the stripping phase. The temperature of the extraction process is a matter of convenience and is normally carried out at ambient temperature.

Figure 8:
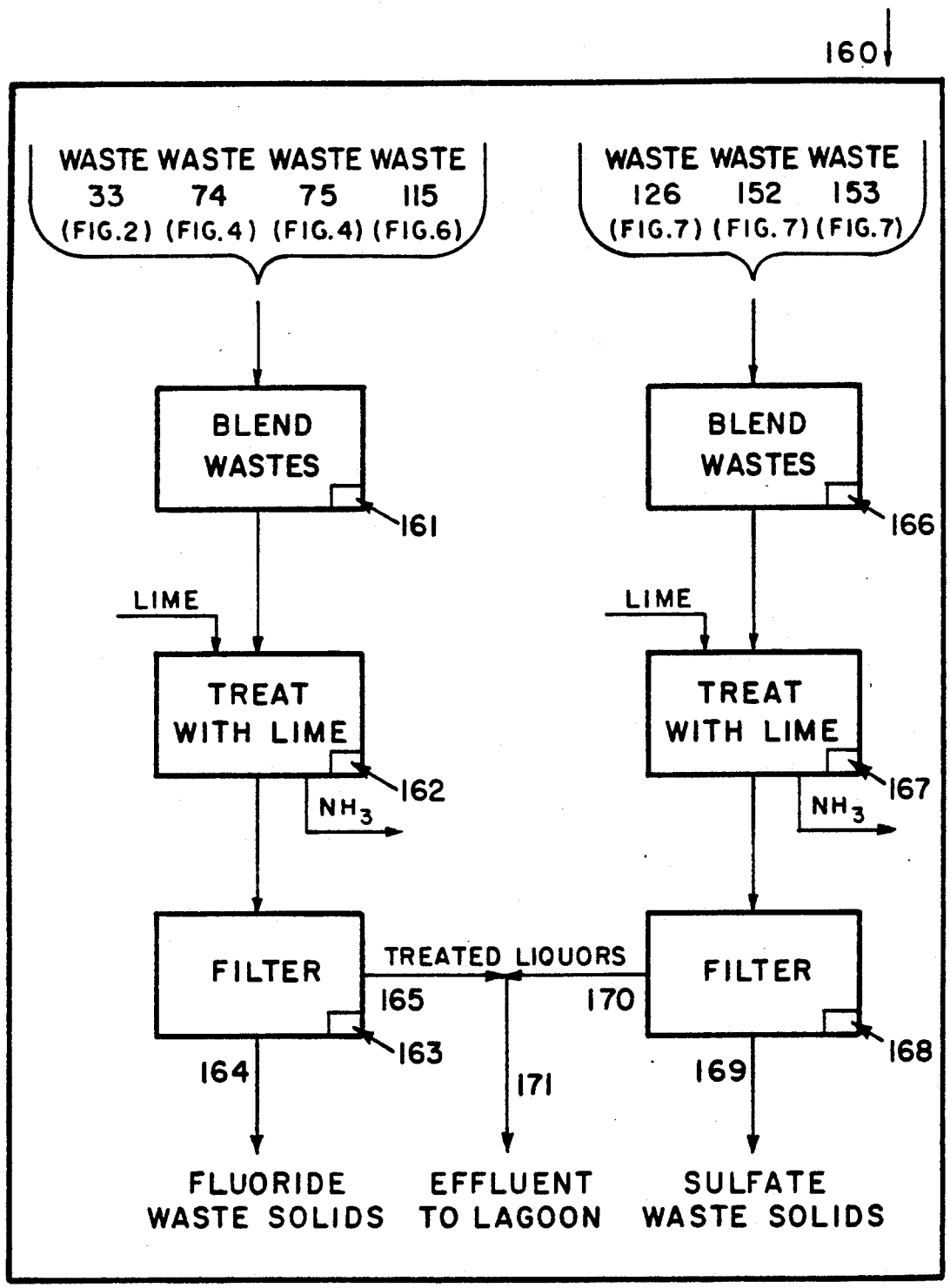
FIG. 8 is a schematic block diagram showing the waste treatment process shown as block 160 in FIG. 1.

In a preferred embodiment, where the aqueous stripping solution 65 is acidic, the aqueous stripping solution 66 is conveyed to vessel 68 wherein the metal values are reacted with a stoichiometric excess of base, preferably gaseous or aqueous ammonia to form a metal hydroxide precipitate 69. After decanting and/or filtering in vessel 70, a solids stream 71 containing tantalum and columbium concentrates is preferably recycled to the digester 24 in the process section 20 of FIG. 2 for recovery of the additional tantalum and columbium values by conventional means as described above with reference to FIG. 2. A portion of the liquor filtrate 72 is acidified 73 with hydrofluoric acid for recycling as stripping solution 65. The remaining portion 74 of the liquor filtrate 72 as well as the aqueous solution 75 coming from extraction 61 is sent to waste treatment (FIG. 8).

ROASTING OF SLURRIED SLUDGE

Figure 5:
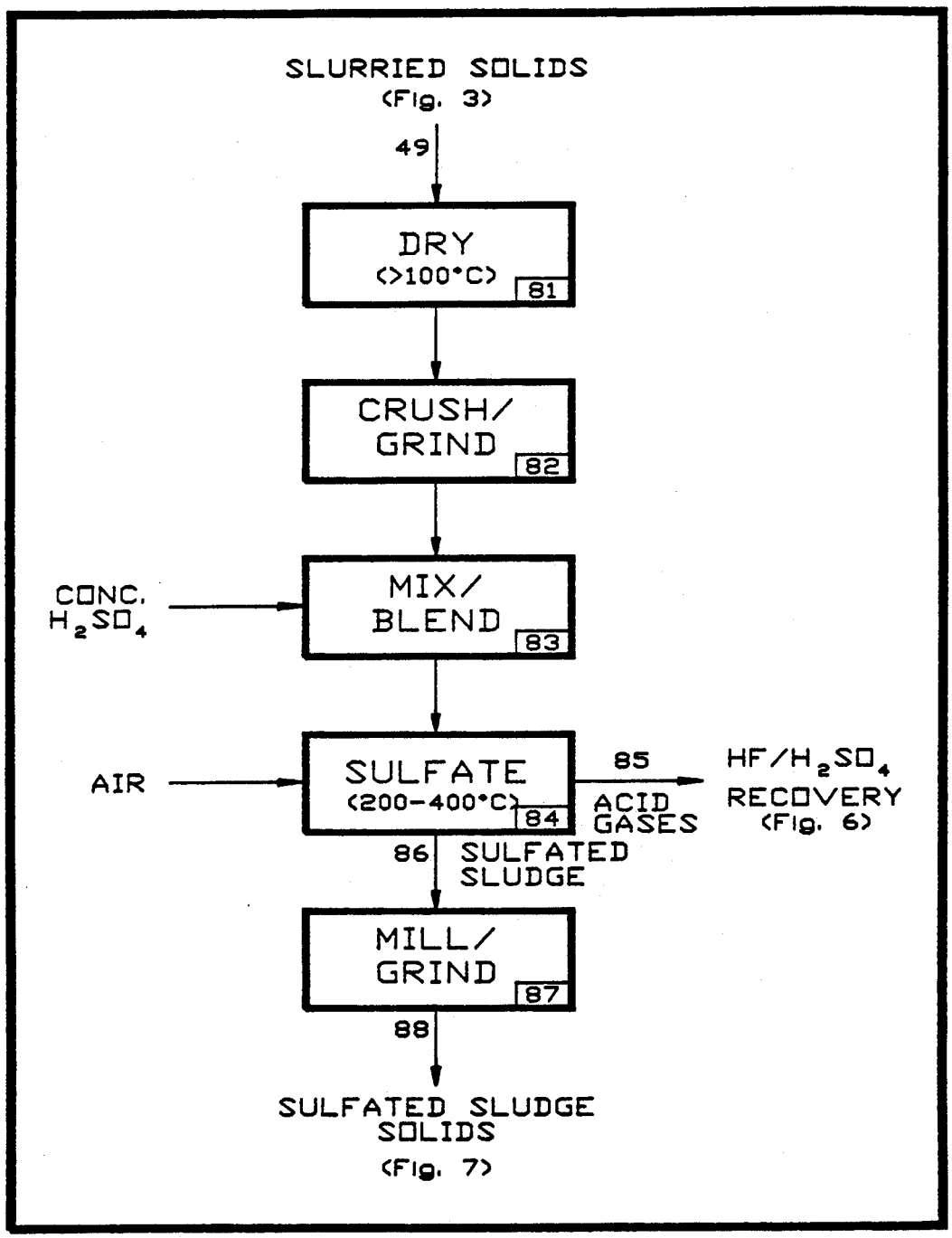
FIG. 5 is a schematic block diagram showing the sulfation/roasting process shown as block 80 in FIG. 1.

FIG. 5 illustrates the process section for the improved recovery of metal values from sludge as well as for the recovery of valuable by-product hydrofluoric acid, according to the invention.

The slurried sludge stream 49 (from FIG. 3) is preferably dried to remove residual moisture 81, crushed or ground 82, and thereafter mixed and blended 83 with a stoichiometric excess of sulfuric acid, preferably 10% to 15% or more on a sulfate to fluoride equivalent basis, then roasted for recovery of acids and additional metal values. Alternatively, concentrated sulfuric acid may be added directly to the solids without premixing in the roaster 84, e.g. rotary calciner, but it was found to be uneconomical in that 100% excess acid (i.e, twice the amount of $H_2SO_4$ for each equivalent of contained fluorine) was required to achieve comparable fluoride removal. Furthermore, even under such excess acid conditions, the fluoride removal from the solids is not as complete as when sulfuric acid is thoroughly premixed with the sludge prior to roasting.

In practice, roasting of solids can be performed for about one to ten hours at 200° C. to 400° C. on a continuous basis. It is preferable to perform the roasting for about 2 hours at a temperature of 350° C. to 400° C. in order to vaporize excess sulfuric acid. Roasting temperatures, however, should be controlled to avoid excessive wear of the equipment.

During roasting, the sulfuric acid reacts with the fluoride salts in the leached sludge to convert the fluoride salts to sulfate salts. The roasted sulfated solids 86 are removed from the roasting kiln 84 and are ground or ball milled 87, if necessary. The ground sulfated sludge solids 88 are used for the subsequent extraction of uranium, thorium and other metal values as discussed below with respect to FIG. 7.

For various reasons including economics, improved yield and recovery of higher concentrations of hydrofluoric acid, and reduced heat losses, the volume of the roasting gas 85 is preferably minimized by limiting the volume of air entering the roasting kiln 84 and operating the kiln at slightly below atmospheric pressure, preferably under a vacuum of 0.1 to 0.5 centimeters of mercury (cm/Hg). Prior to entering the roasting kiln, the slurried sludge solids 49 are dried 81 in order to maximize the concentrations of acids to be recovered later.

Figure 6:
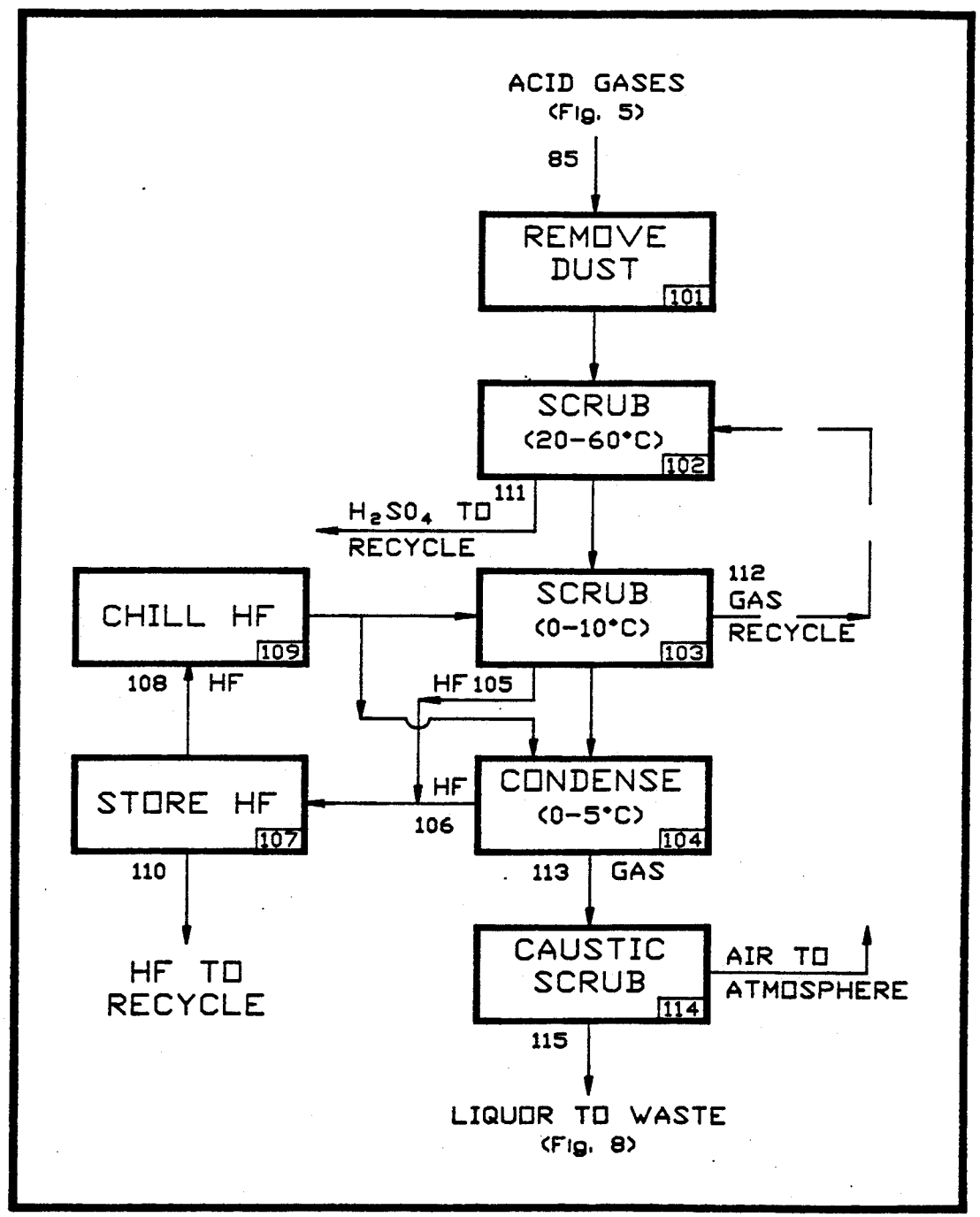
FIG. 6 is a schematic block diagram showing the recovery of hydrofluoric and sulfuric acids shown as block 100 in FIG. 1.

The fluoride content of the fluoride salts is converted into gaseous hydrofluoric acid which, along with volatilized excess sulfuric acid, is collected for later reuse and recycle, as shown in FIG. 6.

ACID RECOVERY

FIG. 6 illustrates the process section for recovering hydrofluoric and sulfuric acids from the gaseous stream exiting the roasting kiln 84 for reuse in the leaching or digesting portions of the overall process.

The roasting gas 85 from the roasting kiln 84 passes through dust control units 101 to trap and recycle dust particles, then enters scrubber/demister units 102 and 103 for the removal of HF and $H_2SO_4$ gases and mists from the gas phase. The preferred scrubbers are one which have vigorous gas/solution contact, for example, Petersen Candles, available from the Union Carbide Corporation.

In practice, it was discovered that in order to improve the separation of $H_2SO_4$ from HF acids, it was desirable to have two such Petersen type scrubbers. The first scrubber 102 is maintained at a temperature above about 20° C., preferably from 50° C. to 60° C. so that only the $H_2SO_4$ is condensed for recovery while the remaining gases are sent to the second scrubber 103 maintained at less than about 10° C., preferably about 0° C., to condense and recover most of the aqueous HF separately. Gases leaving the second scrubber 103 pass through a condenser 104 which is maintained at less than 5° C., preferably about 0° C., to condense and recover additional HF. The condensed aqueous HF 105 from scrubber 103 and the condensed aqueous HF 106 from condenser 104 are joined in storage tank 107. Some of this mixed aqueous HF 108 is recycled from tank 107 through chiller 109 for use as cooling fluid in scrubber 103 and condenser 104. The remaining mixed aqueous HF 110 may be recycled for use in the leaching and digestion steps as for example digester 24 in FIG. 2. The excess $H_2SO_4$ condensate 111 may either be recycled or sent to waste treatment.

In order to improve the separation of hydrofluoric and sulfuric acids, about 50% to 90% of the gas exiting the second scrubber 103 is recycled 112 to the first scrubber 102. The noncondensed gas 113 exiting from condenser 104 passes through a caustic scrubber 114 to insure that no noxious gases enter the atmosphere. Liquor 115 from scrubber 114 is sent to waste treatment (FIG. 8).

Uranium and Thorium Extraction

Figure 7:
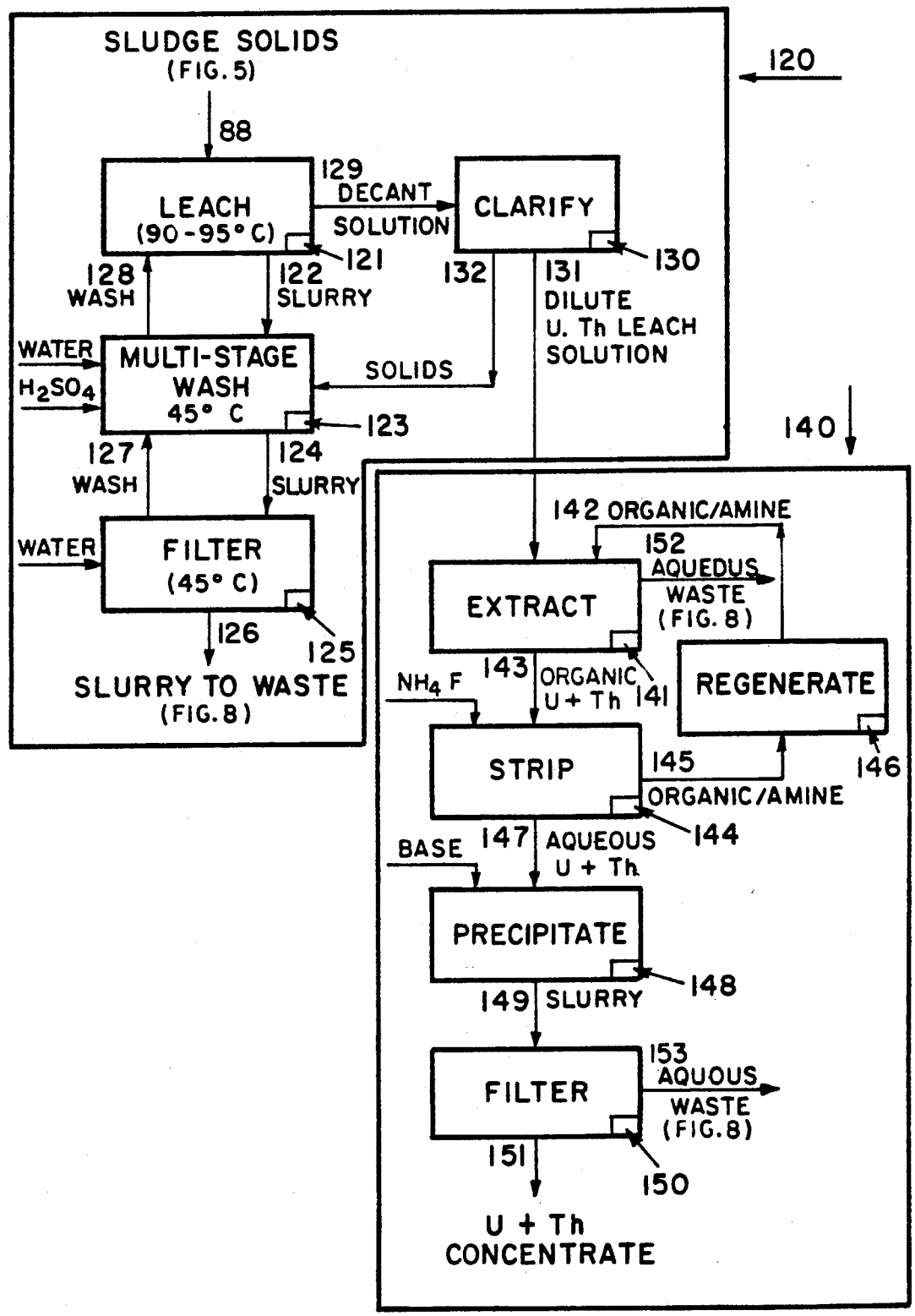
FIG. 7 is a schematic block diagram showing the leaching, extraction and recovery of thorium and uranium from the sulfated solids shown as blocks 120 and 140 in FIG. 1.

FIG. 7 illustrates the process sections 120 and 140 of FIG. 1 for the extraction and recovery of uranium and thorium values according to the invention.

According to the invention, the roasted sulfated sludge 88 from the sulfation/roasting process of FIG. 5 is mixed and leached with any suitable concentration of dilute sulfuric acid such as, for example 0.1 M to 5.0 M, preferably about 0.5 M. The solids to liquid ratio may vary widely during leaching, as for example, from about 1:2 to about 1:100 (i.e., kilograms of solids to liters of sulfuric acid). However, for complete leaching of uranium and thorium and for economic reasons it is preferred that the ratio vary from about 1:4 to about 1:8 of solids to liquids. The leaching 121 is performed at temperatures ranging from 40° C. to 100°0 C., preferably about 90° C. to 95° C. for a period of time sufficient to dissolve quantitatively the uranium and most of the thorium from the solids, normally 1 hour or less, preferably about 15 minutes. A relatively high concentration solids slurry stream 122 produced from the leaching is then washed, preferably with fresh dilute sulfuric acid, at a temperature ranging from about 40° C. to about 50° C., preferably about 45° C., so as to maximize the dissolution of residual undissolved thorium into the liquid stream. This may be performed by a multistage countercurrent wash system 123. The washed slurry 124 is then filtered 125 as illustrated in FIG. 7. In this system, all the water-sulfuric acid wash liquid enters the slurrying and separation operations 123 and 125 and is then returned 127, 128 to the leaching tank 121. The leached solids are filtered 125, slurried with water and sent to waste 126.

The concentrated leach solution is decanted to produce a leach solution 129 which is clarified 130 to produce a leach solution 131 containing dissolved uranium, thorium, zirconium and other trace metals. Solids 132 removed during clarification 130 are returned to the wash system 123.

The leach solution 131 is thereafter extracted in multistage countercurrent mixer/settler units 141 with an organic solvent containing a suitable amine 142, preferably PRIMENE [JMT] JM-T ® brand organic solvent (Rohm and Haas Co., Philadelphia, PA) to recover uranium, thorium, and zirconium metal values as well as any remaining tantalum, columbium or other trace metals from the leach solution 131.

Extraction at unit 141 is preferably carried out in several stages using an amine, preferably 0.1 PRIMENE [JMT] JM-T ® brand organic solvent. The ratio of organic solvent to leach solution should be sufficient to insure that uranium and thorium are quantitatively transferred from leach solution 131 to the organic phase 143. This ratio is in the range of about 5:1 to about 20:1, preferably about 10:1.

An organic phase 143 is recovered from unit 141, then stripped, preferably with a solution having an organic to aqueous volume ratio of about 3.3:1.0 in strippers 144. Any of the aforementioned Ta/Cb stripping agents may be used. The organic solvent 145 exiting the strippers 144 is preferably regenerated 146 using multistage 10% $Na_2CO_3$ washes having a 3.3:1.0 aqueous to organic ratio followed by a two stage acid loading using a mixture of 0.5 M H and 1M $Na_2SO_4$ and a 10:1 organic to aqueous ratio.

After extraction of the metal values from the leach solution 131 in box 141 of FIG. 7, an aqueous raffinate waste 152 is sent to the waste processing section for treatment as described hereinafter with respect to FIG. 8. The metal-loaded stripping solution 147 is treated with a base to precipitate 148 the metal values as oxides forming a slurry 149 which is then filtered 150 to produce a solid metal values concentrate stream 151 and an aqueous waste stream 153. Examples of suitable bases for precipitating the metal values include, among others, NaOH and $NH_4OH$.

Waste Treatment

FIG. 8 illustrates the process section involved in the final waste treatment portion of the integrated processing system which involves the treatment of two distinct types of waste.

The waste streams from the various aforementioned process sections which contain significant quantities of fluorides are blended 161 and reacted with lime 162. Gaseous ammonia is released, which may be recovered for recycle, leaving a slurry containing primarily calcium fluoride. The slurry is filtered 163 to separate solid 164 and liquid 165 wastes which require different means of disposal.

Waste streams from the uranium and thorium process steps are low in fluorides but high in sulfates. They are mixed 166, treated with lime 167 and filtered 168 to produce a clear aqueous effluent 170 and gypsum 169 which can be easily disposed of in a landfill. The treated liquid wastes from both sources are combined 171 and sent to a holding lagoon.

As will be apparent to those skilled in the art, the invention may be embodied in other forms or carried out in other ways without departing from the spirit or essential characteristics thereof. The present invention, therefore, may be put into practice in various ways and a number of specific embodiments will be described to illustrate the invention with reference to the accompanying examples.

EXAMPLE 1

Slurrying of Residual Sludge

A three stage countercurrent dilute HF slurrying process was operated on a pilot plant scale to recover Ta/Cb in solution from a tin slag sludge. The process was carried out utilizing a liquid-to-solids ratio of approximately 5 mL of 5% HF per 1 gram (on a dry basis) of input sludge which contained 2.29% $Ta_2O_5$ and 2.39% $Cb_2O_5$. The temperature and time of the first stage were about 75° C. and 15 minutes respectively, while each subsequent stage was operated at ambient temperature for 15 minutes. The residual sludge was washed with fresh HF and water filtered. The washed solids contained, on a dry basis, 0.40% $Ta_2O_5$ and 0.20% $Cb_2O_5$ while the output liquor contained 4.56 g/L of $Ta_2O_5$ and 4.42 g/L of $Cb_2O_5$. Thus, 89% and 94% of the $Ta_2O_5$ and $Cb_2O_5$ respectively, were recovered from the sludge feed.

EXAMPLE 2

Ta/Cb Extraction and Recovery From Dilute Aqueous Streams

A dilute aqueous acid liquor obtained from the HF slurrying of Ta/Cb sludge as illustrated in Example 1 contained 4.60 g/L $Ta_2O_5$, 4.90 g/L $Cb_2O_5$, and 17.31 g/L total metal oxides. A Ta/Cb extraction was performed in a pilot plant countercurrent mixer-settler unit, consisting of 10 stages (6 extraction and 4 stripping). The solvent utilized for the Ta/Cb extraction was 0.3 M AMBERLITE LA-2, a secondary amine ion exchanger produced and sold by Rohm & Haas Company, in mineral spirits (90% by volume) with tridecanol (10% by volume) as a modifier. The ratio of organic solvent to aqueous acid liquor was maintained at 1:2. The metal-loaded organic was then stripped with an aqueous stripping solution containing 10% by weight ammonium bifluoride. The stripped organic was left partially loaded with Ta and Cb for reasons of economics and ease of operation. These concentrations could have been lowered by the inclusion of additional stripping stages.

The various streams were composited, sampled, and analyzed with the following results:

|  | Total Oxides (g/L) | $Ta_2O_5$ (g/L) | $Cb_2O_5$ (g/L) |
|---|---|---|---|
| Aqueous/Acid Liquor | 17.3 | 4.60 | 4.90 |
| Aqueous Raffinate | 9.01 | <0.05 | <0.05 |
| Loaded Organic | 29.86 | 18.34 | 7.83 |
| Loaded Stripping Solution | 64.54 | 29.00 | 27.30 |
| Stripped Organic | 9.73 | 8.81 | 0.40 |

Greater than 98% of the Ta and Cb were removed from the aqueous feed liquor and were concentrated to a level of 87% of the total metal oxides contained in the stripping solution. Upon precipitation of the stripping solution with ammonia, the final concentrate product contained 44.9% $Ta_2O_5$, 42.3% $Cb_2O_5$, 6.8% $TiO_2$, 2.6% $SiO_2$, 2.4% $ZrO_2$, 0.030% U and 0.036% Th. This concentrate is returned to digester 24 in FIG. 2, so that uranium and thorium do not leave the system at this point.

EXAMPLE 3

Roasting of Slurried Sludge

Slurried sludge from the dilute HF slurrying as illustrated in Example 1 was roasted with sulfuric acid to convert the insoluble fluoride salts into soluble sulfates. A pilot plant roasting process, which employed an $H_2SO_4$/solids premixing step, was operated utilizing 339 kg of dried, HF-slurried sludge which contained about 44% fluorides. In this example, 677 kg of acid or about 75% excess $H_2SO_4$ (relative to the fluoride content) was utilized to convert the solids from fluorides to sulfates. 530 kg of sulfated solids were produced which had residual fluoride concentrations from 0.4% to 1.3%. Approximately 97% of the fluoride input to roasting was evolved as gaseous hydrofluoric acid and was subsequently processed in the gas recovery system.

This roasted product is potentially saleable for its uranium content since the uranium levels are significant, generally up to about 0.5 weight percent. Additionally, the uranium content in the sulfated state will readily dissolve in limited volumes of water making it attractive to uranium processors.

EXAMPLE 4

Uranium and Thorium Extraction and Recovery

A four-stage countercurrent dilute $H_2SO_4$ leaching process was operated on a pilot plant scale to recover uranium and thorium from the roasted sulfated solids from Example 3 and to generate a waste residue within NRC guidelines for landfill disposal. The process was operated at a liquid-to-solids ratio of 6 mL of 0.5 M $H_2SO_4$ per 1 gram of dry sulfated solids which contained 0.16% U and 0.37% Th. The temperature and time of the first stage were 95° C. and 15 minutes, respectively. Subsequent stages were operated at 45° C. for 15 minutes. The waste slurry contained only 0.010% U and 0.022% Th (on a dry basis) while the leach solution contained about 0.35 g/L uranium and 0.82 g/L thorium. Thus, on an input/output solids basis, approximately 98% of both the uranium and the thorium were solubilized, leaving a landfill-disposable residue having only 0.032 weight percent combined uranium plus thorium.

EXAMPLE 5

U/Th Extraction and Recovery

The sulfuric acid leach liquor generated by dilute $H_2SO_4$ leaching of roasted sludges as in Example 4 was extracted in a pilot plant countercurrent mixer-settler unit having four extraction, four stripping, two regeneration and two acid loading stages. The organic extractant, stripping agent, regenerant, and acid loading phases were respectively 0.1 M PRIMENE JMT mineral spirits with decanol as a modifier, aqueous ten percent ammonium bifluoride, aqueous ten percent ammonium carbonate, and an aqueous mixture of 0.5 M sulfuric acid and 1.0 M sodium sulfate. The organic to aqueous flow rate ratios were respectively 10:1, 3.3:1, 3.3:1, and 10:1. The liquid streams were analyzed as follows:

|  | Total Oxides (g/L) | Zirconium (mg/L) | Uranium (mg/L) | Thorium (mg/L) |
|---|---|---|---|---|
| Feed Liquor | 43.75 | 5300 | 295 | 788 |
| Raffinate | 24.34 | <10 | <10 | <25 |
| Loaded Organic | 1.06 | 530 | 30 | 79 |
| Loaded Strip | 3.50 | 1680 | 125 | 80 |

The solids dissolved in the strip solution were precipitated with ammonia and found to contain 3.6% U, 2.2% Th, and 48.0% Zr.

What is claimed is:

1. A process for recovering metal values from a source material containing at least tantalum and columbium which comprises:
   (a) digesting the source material in concentrated hydrofluoric acid to form a slurry comprising a first aqueous phase containing tantalum and columbium values and a sludge containing entrained therein dissolved tantalum and columbium values along with insolubles;
   (b) separating the first aqueous phase from the sludge;
   (c) extracting the tantalum and columbium values from the separated first aqueous phase by ketone extraction;
   (d) slurrying the sludge with dilute hydrofluoric acid to form a second slurry comprising a second aqueous phase containing the dissolved tantalum and columbium values and a residual slurry;
   (e) separating the second aqueous phase from the residual slurry; and
   (f) extracting the dissolved tantalum and columbium values from the second aqueous phase using a liquid amine exchange agent.

2. The process of claim 1 wherein the second slurry is maintained at a temperature ranging from about 50° C. to about 95° C. for a period of at least about 15 minutes prior to washing.

3. The process of claim 1 wherein the second slurry is washed with additional liquid selected from the group consisting of a dilute aqueous acid solution, water, and mixtures thereof.

4. The process of claim 1, 2 or 3 wherein the step of extracting said dissolved tantalum and columbium values from the second aqueous phase includes the steps of:
   (a) mixing the second aqueous phase with an organic solvent phase comprising a secondary amine whereby the dissolved tantalum and columbium values are transferred from the second aqueous phase to the organic solvent phase;
   (b) separating the metal values-containing organic solvent phase from the second aqueous phase;
   (c) mixing the metal values-containing organic solvent phase with an aqueous stripping solution to form a third aqueous phase into which are transferred the dissolved tantalum and columbium values from the metal values-containing organic solvent phase; and
   (d) treating the third aqueous phase to precipitate and recover the dissolved tantalum and columbium values.

5. The process of claim 4 wherein the organic solvent phase further comprises diluents and modifiers.

6. The process of claim 4 wherein said secondary amine is N-lauryl-trialkylmethylamine.

7. The process of claim 6 wherein the N-lauryl-trialkylmethylamine is present in the organic solvent phase at a concentration ranging from about 0.1 molar to about 0.3 molar.

8. The process of claim 1 further including the steps of: heating the residual slurry with sulfuric acid to convert fluoride compounds into sulfated solids and gaseous hydrofluoric acid.

9. The process of claim 8 wherein the residual slurry is dried prior to heating.

10. The process of claim 8 wherein the residual slurry is heated with an excess of sulfuric acid.

11. The process of claim 8 wherein the residual slurry is heated for about one hour to about ten hours at a temperature of from about 200° C. to about 400° C.

12. THe process of claim 8 wherein the residual slurry is heated for about 2 hours at a temperature of from about 350° C. to about 400° C.

13. The process of claim 8 wherein the gaseous hydrofluoric acid is recovered by the steps comprising:
(a) removing solid particles from the gaseous stream;
(b) cooling the solids-free stream to a temperature of from about 20° C. to about 50° C. to remove sulfuric acid from the solids-free gas stream; and
(c) further cooling the solids-free gas stream to a temperature of from about 0° C. to about 5° C. to condense and recover aqueous hydrofluoric acid.

14. The process of claim 8 further comprising the steps of:
(a) leaching the sulfated solids with dilute sulfuric acid to form a third slurry comprising an aqueous liquid phase containing dissolved uranium and thorium values and a solids phase containing residual undissolved uranium and thorium values;
(b) washing the third slurry with a dilute acid at a temperature of from about 40° C. to about 50° C. to dissolve additional uranium and thorium values;
(c) separating the aqueous liquid phase from the solids phase; and
(d) recovering the uranium and thorium values from the aqueous liquid phase by liquid amine extraction.

15. The process of claim 14 wherein the leaching is performed at a temperature of from about 40° C. to about 100° C. for a period of time up to about one hour.

16. The process of claim 14 wherein the leaching is performed at a temperature of from about 90° C. to about 95° C. for about 15 minutes.

17. The process of claim 14 wherein the third slurry is washed with fresh acid solution to dissolve additional uranium and thorium.

18. The process of claim 14 wherein the third slurry is washed at a temperature of about 45° C.

19. The process of claim 14 wherein the ratio of sulfated solids to sulfuric acid is from about 1:2 to 1:100 kilograms of sulfated solids to liters of sulfuric acid.

20. The process of claim 14 wherein the concentration of the sulfuric acid is from about 0.1 molar to about 5.0 molar.

21. The process of claim 14 wherein the steps of extracting the uranium and thorium values from the aqueous liquid phase comprise:
(a) mixing the aqueous liquid phase with an organic solution containing an amine so as to transfer the uranium and thorium values from the aqueous liquid phase to the organic solution to form a metal-containing organic solution;
(b) separating the metal-containing organic solution from the aqueous liquid phase;
(c) mixing the metal-containing organic solution with an aqueous stripping solution so as to transfer the uranium and thorium values to the aqueous stripping solution leaving a metals-free organic solution; and
(d) treating the aqueous stripping solution with a base to precipitate the uranium and thorium values.

22. The process of claim 14 wherein said organic solution comprises PRIMENE JM-T ® brand organic solvent.

23. A method for treating sludge containing entrained therein dissolved tantalum and columbium values and undissolved uranium and thorium values, comprising
(a) slurrying the sludge with dilute hydrofluoric acid to form a slurry comprising an aqueous acid phase contain the dissolved tantalum and columbium values and a residual slurry;
(b) separating the resulting diluted aqueous acid phase from the residual slurry; and
(c) extracting the tantalum and columbium values from the diluted aqueous acid phase using a liquid amine exchange agent.

24. The process of claim 23 wherein the slurry is maintained at a temperature ranging from about 50° C. to about 95° C. for a period of at least about 15 minutes prior to washing.

25. The process of claim 23 wherein the slurry is washed with a liquid selected from the group consisting of a dilute aqueous acid solution, water, and mixtures thereof.

26. The process of claim 23, 24, or 25 wherein the step of extracting said dissolved tantalum and columbium values from the diluted aqueous acid phase includes the steps of:
(a) mixing the diluted aqueous acid phase with an organic solvent phase comprising a secondary amine whereby the dissolved tantalum and columbium values are transferred from the diluted aqueous acid phase to the organic solvent phase;
(b) separating the metal values-containing organic solvent phase from the diluted aqueous acid phase;
(c) mixing the metal values-containing organic solvent phase with an aqueous stripping solution so as to transfer the dissolved tantalum and columbium values from the metal values-containing organic solvent phase to the aqueous stripping solution; and
(d) treating the aqueous stripping solution to precipitate and recover the dissolved tantalum and columbium values.

27. The process of claim 26 wherein the organic solvent phase further comprises diluents and modifiers.

28. The process of claim 26 wherein said secondary amine is N-lauryl-trialkylmethylamine.

29. The process of claim 28 wherein the N-lauryl-trialkylmethylamine is present in the organic solvent phase at a concentration ranging from about 0.1 molar to about 0.3 molar.

30. The process of claim 23 further including the steps of: heating the residual slurry with sulfuric acid to convert fluoride compounds into sulfated solids and gaseous hydrofluoric acid.

31. The process of claim 30 wherein the residual slurry is dried prior to heating.

32. The process of claim 30 wherein the residual slurry is heated with an excess of sulfuric acid.

33. The process of claim 30 wherein the residual slurry is heated for about one hour to about ten hours at a temperature of from about 200° C. to about 400° C.

34. The process of claim 30 wherein the residual slurry is heated for about 2 hours at a temperature of from about 350° C. to about 400° C.

35. The process of claim 30 wherein the gaseous hydrofluoric acid is recovered by the steps comprising:
 (a) removing solid particles from the gaseous stream;
 (b) cooling the solids-free stream to a temperature of from about 20° C. to about 50° C. to remove sulfuric acid from the solids-free gas stream; and
 (c) further cooling the solids-free gas stream to a temperature of from about 0° C. to about 5° C. to condense and recover aqueous hydrofluoric acid.

36. The process of claim 30 further comprising the steps of:
 (a) leaching the sulfated solids with dilute sulfuric acid to form a second slurry comprising an aqueous liquid phase containing dissolved uranium and thorium values and a solids phase containing residual undissolved uranium and thorium values;
 (b) washing the second slurry with a dilute acid at a temperature of from about 40° C. to about 50° C. to dissolve additional uranium and thorium values;
 (c) separating the aqueous liquid phase from the solids phase; and
 (d) recovering the uranium and thorium values from the aqueous liquid phase by liquid-liquid extraction.

37. The process of claim 36 wherein the leaching is performed at a temperature of from about 40° C. to about 100° C. for a period of time up to about one hour.

38. The process of claim 36 wherein the leaching is performed at a temperature of from about 90° C. to about 95° C. for about 15 minutes.

39. The process of claim 36 wherein the second slurry is washed with fresh acid solution to dissolve additional uranium and thorium.

40. The process of claim 36 wherein the second slurry is washed at a temperature of about 45° C.

41. The process of claim 36 wherein the ratio of sulfated solids to sulfuric acid is from about 1:2 to 1:100 kilograms of sulfated solids to liters of sulfuric acid.

42. The process of claim 36 wherein the concentration of the sulfuric acid is from about 0.1 molar to about 5.0 molar.

43. The process of claim 36 wherein the steps of extracting the uranium and thorium values from the aqueous liquid phase comprise:
 (a) mixing the aqueous liquid phase with an organic solution containing an amine so as to transfer the uranium and thorium values from the aqueous liquid phase to the organic solution to form a metal-containing organic solution;
 (b) separating the metal-containing organic solution from the aqueous liquid phase;
 (c) mixing the metal-containing organic solution with an aqueous stripping solution so as to transfer the uranium and thorium values to the aqueous stripping solution leaving a metals-free organic solution; and
 (d) treating the aqueous stripping solution with a base to precipitate the uranium and thorium values.

44. The process of claim 36 wherein said organic solution comprises PRIMENE JM-T ® brand organic solvent.

* * * * *